US009025494B1

United States Patent
Hughey

(10) Patent No.: US 9,025,494 B1
(45) Date of Patent: May 5, 2015

(54) IPV6 NETWORK DEVICE DISCOVERY

(75) Inventor: Carl Hughey, Middletown, VA (US)

(73) Assignee: Infoblox Inc., Santa Clara, CA (US)

( * ) Notice: Subject to any disclaimer, the term of this patent is extended or adjusted under 35 U.S.C. 154(b) by 287 days.

(21) Appl. No.: 13/431,811

(22) Filed: Mar. 27, 2012

(51) Int. Cl.
*H04L 12/28* (2006.01)
*H04L 29/12* (2006.01)
*H04L 12/56* (2006.01)

(52) U.S. Cl.
CPC ......... *H04L 29/12358* (2013.01); *H04L 45/741* (2013.01)

(58) Field of Classification Search
None
See application file for complete search history.

(56) References Cited

U.S. PATENT DOCUMENTS

| | | | |
|---|---|---|---|
| 7,216,138 B2 * | 5/2007 | Abdallah et al. | 708/204 |
| 7,292,539 B2 * | 11/2007 | Ko et al. | 370/252 |
| 7,292,541 B1 * | 11/2007 | C S | 370/254 |
| 7,307,978 B2 * | 12/2007 | Carlson | 370/349 |
| 7,486,672 B2 * | 2/2009 | Wybenga et al. | 370/389 |
| 7,675,861 B2 * | 3/2010 | Metzger et al. | 370/241 |
| 7,693,092 B2 * | 4/2010 | Nishi | 370/256 |
| 7,697,524 B2 * | 4/2010 | Subramanian et al. | 370/390 |
| 7,764,692 B1 * | 7/2010 | Bhatnagar et al. | 370/392 |
| 7,804,848 B2 * | 9/2010 | Mirtorabi et al. | 370/466 |
| 7,848,230 B2 * | 12/2010 | Shah et al. | 370/229 |
| 7,894,383 B2 * | 2/2011 | Ikeda et al. | 370/328 |
| 7,911,977 B2 * | 3/2011 | Boers et al. | 370/255 |
| 8,265,058 B2 * | 9/2012 | Chen et al. | 370/351 |
| 8,488,486 B2 * | 7/2013 | Ikeda et al. | 370/252 |
| 2004/0120266 A1 * | 6/2004 | Ko et al. | 370/252 |
| 2005/0174989 A1 * | 8/2005 | Chen et al. | 370/351 |
| 2005/0232264 A1 * | 10/2005 | Wybenga et al. | 370/389 |
| 2005/0265259 A1 * | 12/2005 | Thubert et al. | 370/255 |
| 2006/0036733 A1 * | 2/2006 | Fujimoto et al. | 709/225 |
| 2006/0221844 A1 * | 10/2006 | Subramanian et al. | 370/248 |
| 2006/0239199 A1 * | 10/2006 | Blair et al. | 370/248 |
| 2008/0008165 A1 * | 1/2008 | Ikeda et al. | 370/360 |
| 2008/0175240 A1 * | 7/2008 | Suzuki | 370/390 |
| 2008/0228940 A1 * | 9/2008 | Thubert | 709/238 |
| 2010/0080225 A1 * | 4/2010 | Nordmark | 370/392 |
| 2013/0201874 A1 * | 8/2013 | Chen | 370/255 |

OTHER PUBLICATIONS

Hidden et al., IP Version 6 Addressing Architecture, The Internet Society, 2006.

* cited by examiner

*Primary Examiner* — Ian N Moore
*Assistant Examiner* — Phong La
(74) *Attorney, Agent, or Firm* — Van Pelt, Yi & James LLP

(57) ABSTRACT

Internet Protocol version 6 (IPv6) network device discovery techniques are disclosed. In some embodiments, IPv6 network device discovery includes determining a route entry (e.g., selecting a first route entry that is less than 126 bits and greater than 48 bits) of a route entry table of a seed device (e.g., a router, such as a well connected router); converting the route entry to an anycast address; and sending a probe to the anycast address. For example, using various techniques described herein, an Internet Control Messaging Protocol (ICMP) probe, for example, with incrementing hop count and the subnet-router anycast addresses as targets can be used to fully discover network devices on an IPv6 network.

8 Claims, 4 Drawing Sheets

IPV6 NETWORK DEVICE DISCOVERY

BACKGROUND OF THE INVENTION

IP address management (IPAM) tools are increasingly important for effectively and efficiently managing IP based networks as, for example, new Internet Protocol version 6 (IPv6) networks are deployed with larger address pools, different subnetting techniques are employed, and more complex 128-bit hexadecimal numbers, which are not as easily human-readable as Internet Protocol version 4 (IPv4) addresses, are allocated. For example, IPv6 networking, mobile computing, and multi-homing generally require more dynamic address management and, as a result, are rendering impractical early generation techniques of IP address management (IPAM) software, network device discovery, and spreadsheets that were typically used for IP address management.

BRIEF DESCRIPTION OF THE DRAWINGS

Various embodiments of the invention are disclosed in the following detailed description and the accompanying drawings.

DETAILED DESCRIPTION

Figure 1:
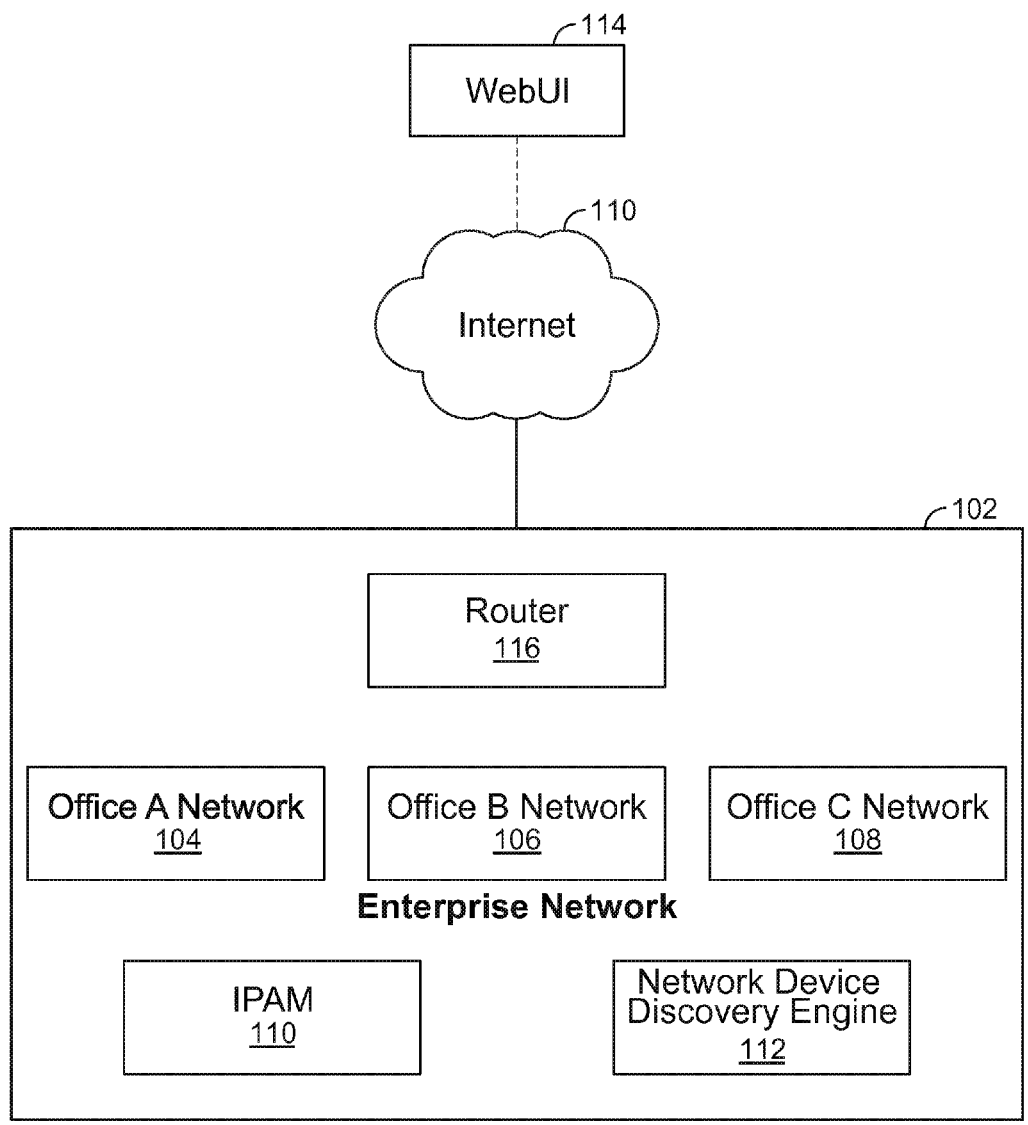
FIG. 1 is a functional block diagram illustrating a network architecture for providing IPv6 network device discovery in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

IP address management (IPAM) tools are increasingly important for effectively and efficiently managing IP based networks as, for example, new Internet Protocol version 6 (IPv6) networks are deployed with larger address pools, different subnetting techniques are employed, and more complex 128-bit hexadecimal numbers, which are not as easily human-readable as Internet Protocol version 4 (IPv4) addresses, are allocated. For example, IPv6 networking, mobile computing, and multi-homing generally require more dynamic address management and, as a result, are rendering impractical early generation techniques of IP address management (IPAM) software, network device discovery, and spreadsheets that were typically used for IP address management.

Larger enterprises generally have larger IP address space(s) and are more commonly looking towards migrating to IPv6 network addressing. Larger enterprises also often have networks that can be geographically diverse (e.g., spanning across multiple floors or buildings within an office complex, multiple offices, multiple regions, and so forth). As a result, such entities may not have adequate visibility into their entire IP address space as their IP addressing can be very complicated, with a significant number of devices and networks.

For example, network device discovery on IPv6 networks can be a very complex, challenging, and time consuming task. In particular, discovery of devices on IPv6 networks is not effective using the same network device discovery techniques currently used on IPv4 networks. For example, the commonly used approach of simple, brute force network ping sweeps are generally not feasible, practical, or desirable in IPv6 address spaces due to the size of such IPv6 address spaces. Also, next hops in route advertisements can use what are referred to as link local addresses (i.e., not global addresses that routers on the network would understand) and, as a result, have no significance to external devices not "on-link." Thus, these and various other aspects of IPv6 networks can hinder current techniques for network device discovery on IPv6 networks.

Thus, what is needed are new and improved techniques for network device discovery on Internet Protocol version 6 (IPv6) networks.

Accordingly, various new and improved techniques for Internet Protocol version 6 (IPv6) network device discovery are disclosed. In some embodiments, IPv6 network device discovery includes determining a route entry (e.g., selecting a first route entry that is less than 126 bits and greater than 48 bits) of a route entry table of a seed device (e.g., a router, such as a well connected router); converting the route entry to an anycast address; and sending a probe to the anycast address. For example, using various techniques described herein, an Internet Control Messaging Protocol (ICMP) probe, for example, with incrementing hop count and the subnet-router anycast addresses as targets can be used to fully discovery network devices on an IPv6 network.

In some embodiments, IPv6 network device discovery further includes determining intermediate hops, in which the intermediate hops correspond to intermediate routers. In some embodiments, IPv6 network device discovery further includes probing the intermediate routers. In some embodiments, IPv6 network device discovery further includes recursively probing the IPv6 network until the IPv6 network is fully discovered (e.g., repeatedly probing the IPv6 network in a manner that is effectively spreading out the network discovery like a tree to the edge of the IPv6 network to fully discover the IPv6 network).

In some embodiments, IPv6 network device discovery further includes receiving a plurality of seed devices; and determining a route entry for each of the plurality of seed devices. In some embodiments, IPv6 network device discovery further includes determining a second route entry of a second route entry table of a second seed device (e.g., a second router); converting the second route entry to a second anycast address; and sending a second probe to the second anycast address. In some embodiments, IPv6 network device discovery further includes automatically identifying one or more routers on the IPv6 network.

These and various other IPv6 network device discovery techniques are described below with respect to the figures and various embodiments described herein.

FIG. 1 is a functional block diagram illustrating a network architecture for providing IPv6 network device discovery in accordance with some embodiments. As shown, an enterprise network 102 includes a network router 116 (e.g., and can include additional network routers) and various subnetworks for different offices, which as shown include Office A Network 104, Office B Network 106, and Office C Network 108 (e.g., which can be in different geographical locations and can also include one or more additional routers). The enterprise network 102 also includes an Internet Protocol Address Management (IPAM) system 110 for managing an Internet Protocol (IP) address space for the enterprise network 102 of an enterprise (e.g., including managing the IP address space for the subnetworks 104, 106, and 108 and the various host devices on the enterprise network 102 including the subnetworks 104, 106, and 108). The enterprise network 102 also includes a network device discovery engine 112, which, for example, can perform the various IPv6 network device discovery techniques described herein. For example, various authorized users, such as authorized network administrators or network managers can access the network device discovery engine 112 and/or the IPAM system 110 through a WebUI 114 (e.g., web based user interface, which provides a graphical user interface (GUI), and which can be accessed via various web browsers) via a network, such as the Internet 110 as shown. In some embodiments, the network device discovery engine performs network discovery on the enterprise network 102 (e.g., which includes IPv6 networks) and provides the discovered IPv6 network device discovered information to the IPAM 110.

In some embodiments, the network device discovery engine 112 is implemented on an Intel based PC running Linux and Ethernet, such as on a server or an appliance. In some embodiments, the network device discovery engine 112 is implemented as a virtual machine (VM) executed as a virtual server. In some embodiments, the network device discovery engine 112 is implemented as part of a network operation center (e.g., executed on a server, appliance, or as a VM on a virtual server) that communicates with one or more distributed collectors (e.g., appliances) to perform network operation management operations for multiple networks and/or multiple physical network sites. In some embodiments, the network device discovery engine 112 is implemented as part of a network operation center (e.g., executed on a server, appliance, or as a VM on a virtual server) that also collects various network policy related information (e.g., network policy compliance information), statistical information, configuration change information and can provide, for example, various network configuration recommendations (e.g., router running out of buffer space, recommend configuration change, and/or other network configuration change recommendations). For example, these techniques can be implemented for IPv6 network discovery provided for a network analysis and automation product, such as the commercially available NetMRI product line available from Infoblox Inc. For example, such techniques as described herein can significantly increase node discovery rates for network device discovery and percentage of devices discovered in IPv6 based network environments.

In some embodiments, the network architecture as shown in FIG. 1, or other similar network architectures as will now be apparent to one of ordinary skill in the art in view of the disclosed embodiments, can be used for implementing the various techniques for IPv6 network device discovery as described herein. For example, the network device discovery engine 112 can be implemented as part of or integrated with the IPAM appliance 110. As another example, the network discovery engine can communicate with multiple network collectors for assisting in the network discovery for different subnets (e.g., including, for example, by having different collectors on each of the various subnets for Office A network 104, Office B network 106, and Office C network 108 of the enterprise network 102). As yet another example, the network device discovery engine 112 can be performed on a device that is remote from the enterprise network 102 and accessing the enterprise network 102 using locally controlled collectors (e.g., using secure communications between the locally controlled collectors and the network device discovery engine 112).

IPv6 network device addresses generally include three primary components: a Global Routing Prefix (GRP), a Subnet ID, and an Interface ID. Each of these components is expressed in hexadecimal digits. IPv6 addresses are generally classified by the primary addressing and routing methodologies common in networking: unicast addressing, anycast addressing, and multicast addressing. A unicast address identifies a single network interface. The Internet Protocol delivers packets sent to a unicast address to that specific interface. An anycast address is assigned to a group of interfaces, usually belonging to different nodes. A packet sent to an anycast address is delivered to just one of the member interfaces, typically the nearest host, according to the routing protocol's definition of distance. Anycast addresses generally cannot be identified easily, as they have the same format of unicast addresses, and differ only by their presence in the network at multiple points. Almost any unicast address can be employed as an anycast address.

Because brute force, ping sweep approaches are not useful for IPv6 network device discovery and the global addresses of next hop routers are not directly available from IPv6 routing tables, techniques for determining the global addresses of routers on the IPv6 network are needed for performing further IPv6 network device discovery. However, it is also undesirable to require users (e.g., network administrators) to manually enter the IPv6 network address of each and every router on their network.

Accordingly, in some embodiments, only an IPv6 network address and SNMP/CLI credentials of a seed router (e.g., at least one router on the IPv6 network) are required. For example, SNMP credentials can be used for accessing active device configuration information, such as routing tables, and CLI credentials can be used for accessing other router data information and configuring from a CLI (Command Line Interface). Preferably, the seed router is a well connected router. Also, multiple seed router devices can be entered and used for the IPv6 network device discovery process as described herein.

For example, using various IPv6 network device discovery techniques described herein, one or more seed devices (e.g., routers) on the network are identified and their SNMP credentials (e.g., username and password and/or other forms of credentials) and CLI credentials (e.g., username and password and/or other forms of credentials) are provided. These one or more seed devices can then be used to discover and identify other routers on the IPv6 network. The network discover process expands (e.g., recursively) to discover all network devices on the IPv6 network (e.g., including, for example, the various subnets for Office A network 104, Office B network 106, and Office C network 108 of the enterprise network 102).

For example, it can only be required that at least one seed device address is provided (e.g., a manually entered network address of a router device, as well as SNMP credentials to access the router's active configuration and statistical information and CLI to perform any commands, such as for reconfigurations). The user (e.g., network administrator) can also input a network address range to indicate the network address range that is to be discovered for the enterprise's IPv6 network. The routing table can then be obtained from the seed device to initiate the IPv6 network discovery process as described further below. Preferably, the initial seed device is a well connected router. The user can also manually enter multiple seed devices, such as if there is no single, well connected router device.

Accordingly, using the above-described techniques, the network device discovery engine 112 can obtain the routing tables from one or more known seed devices (e.g., routers). However, the next hop addresses obtained from the routing tables cannot be used directly from the network device discovery engine 112 for the reasons discussed above. Various techniques for how to use just the route entry without next hop information to steer an efficient and effective IPv6 network discovery are described below.

In some embodiments, the IPv6 route entry is used to determine if further processing should be performed. For example, determining whether further processing should be performed can include determining whether the route entry is within a desired discovery range. As another example, determining whether further processing should be performed can also include determining whether the route entry is within a desired size range, such as between 48 and 126 bits in size (i.e., greater than 126 bits in size and less than 48 bits in size). In particular, addresses /127 and /128 can be handled as first/last address or only address, respectively. Ranges smaller than /48 (e.g., and default route ::/0) are typically not used. For example, /48 is currently the most likely IPv6 address assignment range an enterprise would typically receive—smaller mask sizes (larger aggregation) or default routes would most likely point to a higher level of network aggregation (e.g., an upstream Internet Service Provider (ISP)). If it is already a /128 address, then it is already fully qualified, so there is nothing further to discover. If it is /127 or /126 then it is a point-to-point network, so again no further discovery is needed as just those 2 nodes are present on that point-to-point network. However, if it is between /48 and /128, then probing is needed to perform further discovery to discover network devices on the IPv6 network. As would be apparent to those of ordinary skill in the art in view of the various embodiments described herein, these IPv6 network discovery techniques can also be applied to address spaces of size /48 or larger if desired (e.g., in the above example it is directed to enterprise network discovery, and given that an enterprise typically would not have an IPv6 address space that is as large as /48 or larger, the network range that is used for discovery is between /48 and /126 as discussed above).

If the route entry is determined to be within the desired discovery range, and if the route entry is within the desired network size (e.g., between 48 and 126 bits in size as discussed above), then the route entry is converted into a subnet-router anycast address target to be used as the destination of an ICMP based hop count probe (e.g., trace route) pursuant to IETF RFC 4291, Section 2.6.1. For example, if a first entry is an IPv6 network address that ends with a /64, then that address can be converted into an anycast address by simply making that network address end with a /128 instead of a /64 (e.g., an entry of O 2001:DB8:A2:A01::/64 [110/2] can be converted to an anycast address of O 2001:DB8:A2:A01::/128).

In particular, pursuant to IETF RFC 4291, Section 2.6.1, the Subnet-Router anycast address is predefined. The format of the subnet-router anycast address includes a subnet prefix (n bits) and /0000000000000000 (128-n bits). The subnet prefix in an anycast address is the prefix that identifies a specific link. This anycast address is syntactically the same as a unicast address for an interface on the link with the interface identifier set to zero. Packets sent to the Subnet-Router anycast address will be delivered to one router on the subnet. All routers are required to support the Subnet-Router anycast addresses for the subnets to which they have interfaces. The Subnet-Router anycast address is intended to be used for applications where a node needs to communicate with any one of the set of routers.

In some embodiments, an ICMP probe is sent towards the target subnet-router anycast address and intermediate hops are recorded. For example, such intermediate hops are known to correspond to the intermediate routers. Thus, the intermediate hops are used to identify the intermediate routers on the IPv6 network, and the intermediate routers are then added onto a list for further discovery.

This approach has several advantages to simply selecting a network address at random within the desired subnet and sending a probe to the randomly selected network address. First, at least one router on the network should respond to the probe pursuant to IETF RFC 4291, Section 2.6.1. In practice, this is not always the case, but IETF RFC 4291, Section 2.6.1 requires that at least one router serving the subnet should respond, which provides a much higher likelihood of a response than a randomly selected address. Even if a direct response to the probe is not received, intermediate hops are still recorded and, thus, can be used for further discovery. Also, because, by definition, the subnet-router anycast address is handled by routers servicing the subnet, the probes are "pre-directed" towards other routers on the network. This directs the search to discover other routers (e.g., a random address on a subnet may respond to a probe, but then we would have to determine if it is another router before we can use it as a seed to discover other networks). This approach also minimizes the potential that non-routers will have to process the probes at all (e.g., avoiding an unnecessary traffic impact on network devices that are not routers on the enterprise network that is being discovered). In addition, in the IPv4 network context, it is fairly common to address a router as 0.1 (i.e., the first device off of the subnet of the IPv4 network). As a result, IPv4 network discovery techniques commonly would attempt to discover a router on each subnet by using that subnet and 0.1 address or, similarly, to actually attempt using the first ten and last ten addresses of each subnet to discover routers on each subnet. However, that approach is not common in an IPv6 network context. A router can configure its own address on a global interface, in which it uses an algorithm based on its MAC address to fill in the last 64 bits of its address using the EUI-64 (Extended Unique Interface-64) automatic addressing scheme, which makes the above-described IPv4 common network addressing technique inapplicable in the IPv6 network context.

In some embodiments, network addressing hints for an enterprise network (e.g., for a given enterprise, in which different enterprises may employ different network addressing practices and/or schemes) are used to check each subnet based on the network addressing hints to identify routers on each subnet of that enterprise network. For example, if a network addressing hint specifies that routers can be addressed with IPv6 network addresses ending in 1011:1011:1011:1011, then when performing discovery on each such subnet of that enterprise network, a hint based check within each subnet can be performed (e.g., for subnet 2001:db8:a2:a05, the hint based check would look to discover 2001:db8:a2:a05:1011:1011:1011:1011).

Accordingly, the results of the probes are used as a basis to discover other routers on the network. Each of the other routers that are discovered using these techniques can then potentially offer more routes to probe, and the cycle repeats until all routers, routes, and hint based discovery checks are exhausted. Using these techniques, the IPv6 network can be efficiently and effectively fully discovered.

Figure 2:
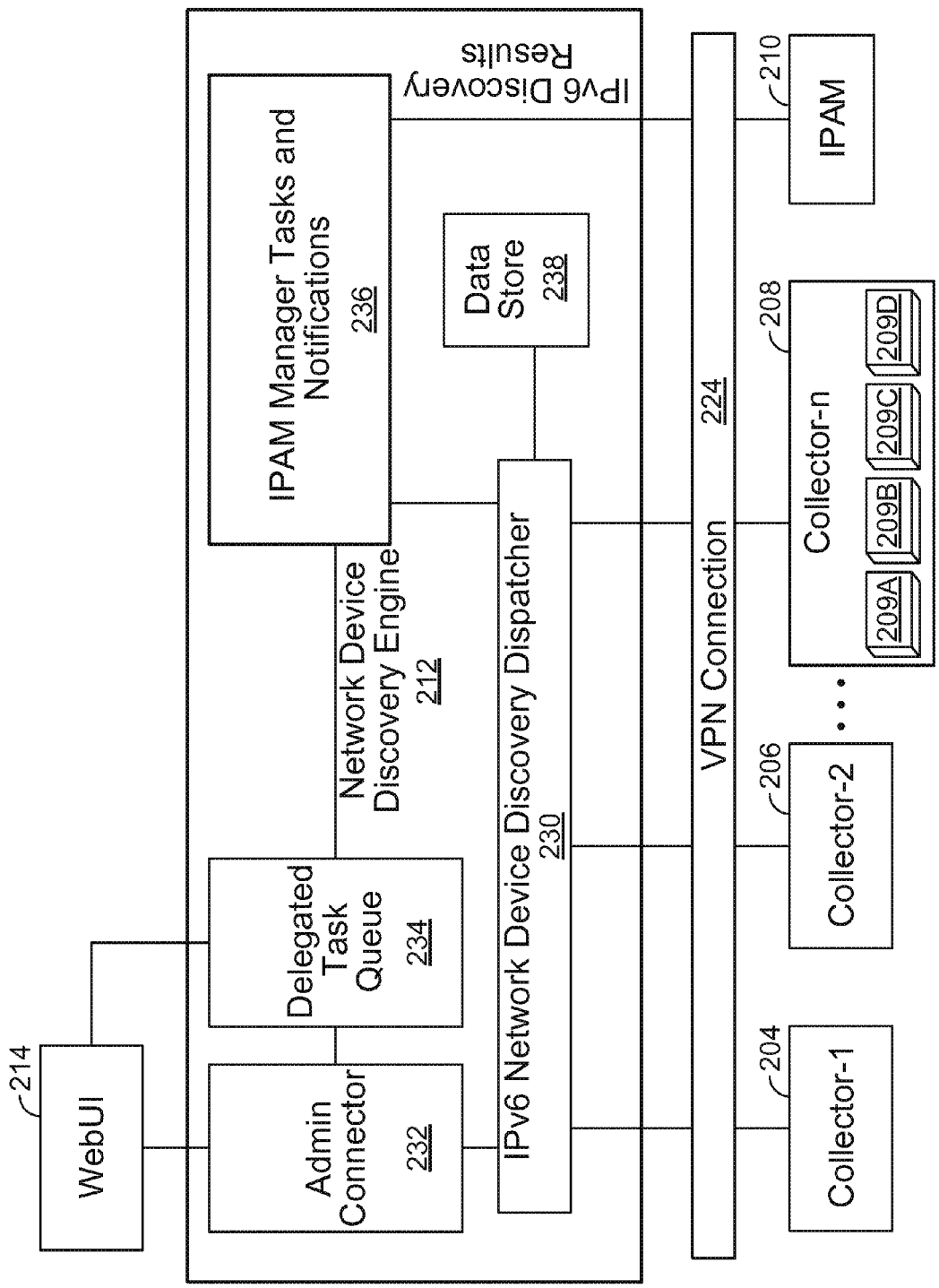
FIG. 2 is a functional block diagram illustrating a computing architecture for providing IPv6 network device discovery in accordance with some embodiments.

FIG. 2 is a functional block diagram illustrating a computing architecture for providing IPv6 network device discovery in accordance with some embodiments. As shown, a network device discovery engine 212 (e.g., implemented as software executed on a computing device, such as a server, appliance, or virtual appliance) is in network communication with a WebUI 214. As also shown, the network device discovery engine 212 is in communication with multiple IPv6 network device discovery collectors including collector-1 204, collector-2 206, and collector-n 208 (also referred to herein as collectors 204, 206, and 208) as well as an IPAM device 210. The network device discovery engine 212, collectors 204, 206, and 208, and IPAM device 210 are in secure communication via a VPN connection 224 (e.g., an OpenSSL VPN connection). As also shown with respect to collector-n 208, the collectors can include a plurality of path workers (e.g., path explorers), which can be spawned and executed as needed to explore one or more network paths to efficiently explore multiple paths concurrently executed as concurrent processes on a collector device (e.g., server, appliance, or as a VM on a virtual server). The network device discovery engine 212 includes an IPv6 network device discovery dispatcher 230, admin connector 232, delegated task queue 234, IPAM manager tasks and notifications 236, and data store 238, which are exemplary functional modules for performing various functions as described herein and as would be apparent to one of ordinary skill, such functions can be implemented in various other ways (e.g., integrated or in different functional modules or combinations) to achieve functions similar to those described herein. The admin connector 232 interacts with the IPv6 network device discovery dispatcher 230 for communicating with collectors 204, 206, and 208. The admin connector 232 also interacts with a WebUI 214. The WebUI 214 provides a user interface for interacting with the network device discovery engine 212 (e.g., using a computing device, such as a laptop, desktop computer, smart phone, or tablet executing a web browser to interact with the network device discovery engine 212 via a web interface, such as a portal requiring appropriate login credentials as further described herein).

Referring to FIG. 2, the IPAM manager tasks and notifications 236 is in communication with the delegated task queue 234. For example, a network admin can use the WebUI 214 to perform certain actions (e.g., discover one or more IPv6 networks, perform IPv6 network discovery and policy compliance analysis, and various other actions as described herein). The results of such actions, such as IPv6 network device discovery results, can be communicated by the IPAM manager tasks and notifications 236 to the delegated task queue 234, which communicates such actions as delegated tasks (e.g., tasks or actions that can then be delegated to appropriate IPAM devices to be performed by such IPAM devices) to the HTTP dispatcher 230, such as then to the IPAM 210 as shown. In addition, IPv6 network device discovery results (e.g., received from the collectors 204, 206, and 208) can also be stored in the data store 238 (e.g., stored using a Berkeley database or any other form of database or using other data storage techniques). In some embodiments, IPv6 network device discovery facilitates updating and synchronization of IP address space information for IPAM devices, such as IPAM 210.

In some embodiments, the computing architecture as shown in FIG. 2, or other similar computing architectures as will now be apparent to one of ordinary skill in the art in view of the disclosed embodiments, can be used for implementing the various techniques for IPv6 network device discovery as described herein. For example, collectors 204, 206, and 208 can be implemented as part of or integrated with the network device discovery engine 212. As another example, collectors 204, 206, and 208 can be implemented as part of or integrated with IPAM devices, such as IPAM 210.

Figure 3:
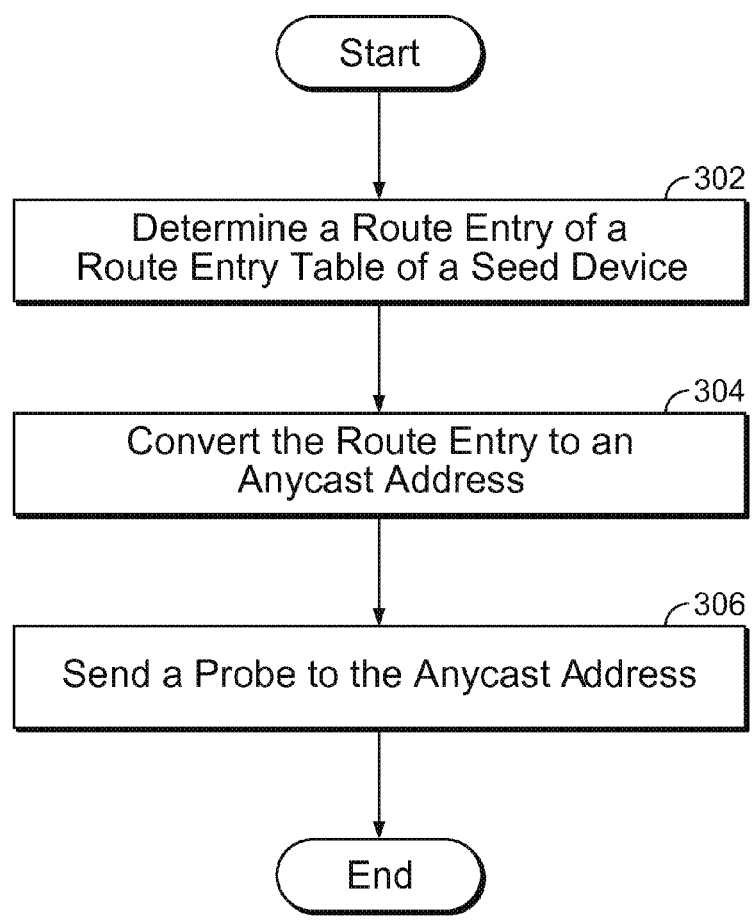
FIG. 3 is a flow diagram illustrating IPv6 network device discovery in accordance with some embodiments.

FIG. 3 is a flow diagram illustrating IPv6 network device discovery in accordance with some embodiments. At 302, determining a route entry (e.g., selecting a first route entry that is less than 126 bits and greater than 48 bits) of a route entry table of a seed device (e.g., a router, such as a well connected router) is performed. In some embodiments, IPv6 network device discovery further includes receiving a plurality of seed devices and determining a route entry for each of the plurality of seed devices. At 304, converting the route entry to an anycast address is performed. At 306, sending a probe to the anycast address is performed.

Figure 4:
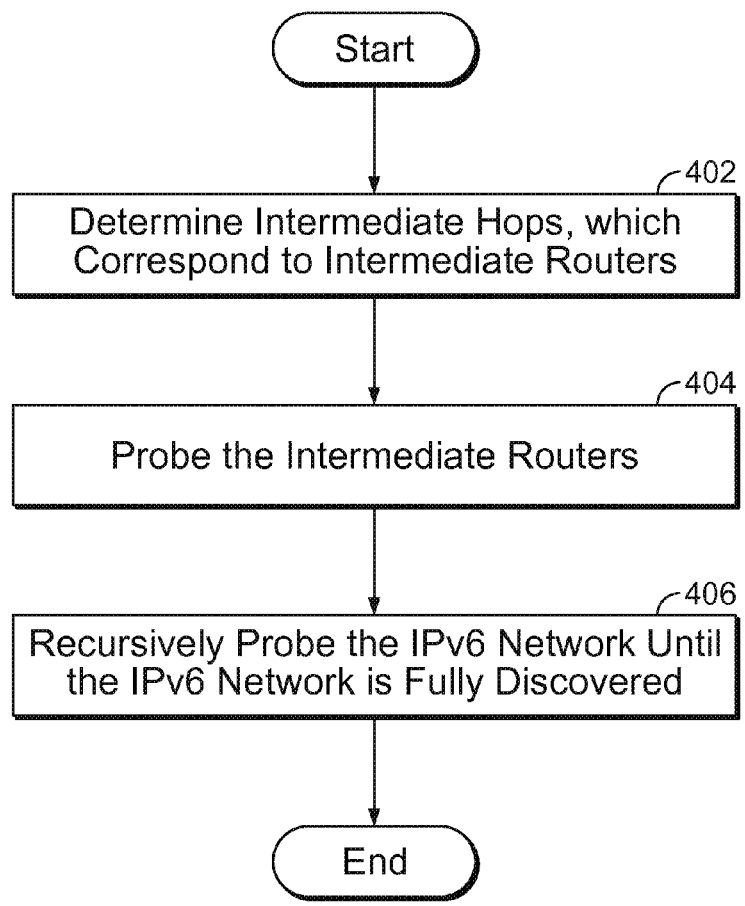
FIG. 4 is another flow diagram illustrating IPv6 network device discovery in accordance with some embodiments.

FIG. 4 is another flow diagram illustrating IPv6 network device discovery in accordance with some embodiments. At 402, IPv6 determining intermediate hops is performed, in which the intermediate hops correspond to intermediate routers. At 404, probing the intermediate routers is performed. At 406, recursively probing the IPv6 network until the IPv6 network is fully discovered is performed (e.g., repeatedly probing the IPv6 network using repeated Internet Control Messaging Protocol (ICMP) probes with incrementing hop count and subnet-router anycast addresses as targets in a manner that is effectively spreading out the network discovery like a tree to the edge of the IPv6 network to fully discover the IPv6 network).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for Internet Protocol version 6 (IPv6) network device discovery, comprising:
   a processor configured to:
      determine a first route entry of a first route entry table of a first seed device;
      convert the first route entry to a first anycast address, wherein the converting of the first route entry to the first anycast address comprises:

determine whether a network prefix length of the first route entry is between 48 and 126 bits; and in the event that the network prefix length of the first route entry is not between 48 and 126 bits:

take no further action regarding the first route entry in the event that the network prefix length of the first route entry is 127 bits or 128 bits;

send a first probe to the first anycast address;

receive information relating to a first plurality of seed devices in response to the first probe, each of the first plurality of seed devices being different from the first seed device;

determine a second route entry of a second route entry table for one of the first plurality of seed devices;

determine intermediate hops, wherein the intermediate hops correspond to intermediate routers;

probe the intermediate routers; and recursively probe the IPv6 network based on the second route entry, comprising:

convert the second route entry to a second anycast address;

send a second probe to the second anycast address;

receive information relating to at least one seed device in response to the second probe, each of the at least one seed device being different from the first plurality of seed devices; and determine a third route entry of a third route entry table for one of the at least one seed device; and a memory coupled to the processor and configured to provide the processor with instructions.

2. The system recited in claim 1, wherein determining a route entry of a route entry table of the first seed device, further comprises:

select a first route entry having a network prefix length that is less than 126 bits.

3. The system recited in claim 1, wherein determining a route entry of a route entry table of the first seed device, further comprises:

select a first route entry having a network prefix length that is less than 126 bits and greater than 48 bits.

4. The system recited in claim 1, wherein the processor is further configured to:

automatically identify one or more routers on the IPv6 network.

5. A method for Internet Protocol version 6 (IPv6) network device discovery, comprising:

determining a first route entry of a first route entry table of a first seed device;

converting the first route entry to a first anycast address, wherein the converting of the first route entry to the first anycast address comprises:

determining whether a network prefix length of the first route entry is between 48 and 126 bits; and in the event that the network prefix length of the first route entry is not between 48 and 126 bits:

taking no further action regarding the first route entry in the event that the network prefix length of the first route entry is 127 bits or 128 bits;

sending a first probe to the first anycast address;

receiving information relating to a first plurality of seed devices in response to the first probe, each of the first plurality of seed devices being different from the first seed device;

determining a second route entry of a second route entry table for one of the first plurality of seed device;

determining intermediate hops, wherein the intermediate hops correspond to intermediate routers;

probing the intermediate routers; and recursively probing the IPv6 network based on the second route entry, comprising:

converting the second route entry to a second anycast address;

sending a second probe to the second anycast address;

receiving information relating to at least one seed device in response to the second probe, each of the at least one seed device being different from the first plurality of seed devices; and determining a third route entry of a third route entry table for one of the at least one seed device.

6. A computer program product for Internet Protocol version 6 (IPv6) network device discovery, the computer program product being embodied in a tangible non-transitory computer readable storage medium and comprising computer instructions for:

determining a first route entry of a first route entry table of a first seed device;

converting the first route entry to a first anycast address, wherein the converting of the first route entry to the first anycast address comprises:

determining whether a network prefix length of the first route entry is between 48 and 126 bits; and in the event that the network prefix length of the first route entry is not between 48 and 126 bits:

taking no further action regarding the first route entry in the event that the network prefix length of the first route entry is 127 bits or 128 bits;

sending a first probe to the first anycast address;

receiving information relating to a first plurality of seed devices in response to the first probe, each of the first plurality of seed devices being different from the first seed device;

determining a second route entry of a second route entry table for one of the first plurality of seed devices;

determining intermediate hops, wherein the intermediate hops correspond to intermediate routers;

probing the intermediate routers; and recursively probing the IPv6 network based on the second route entry, comprising:

converting the second route entry to a second anycast address;

sending a second probe to the second anycast address;

receiving information relating to at least one seed device in response to the second probe, each of the at least one seed device being different from the first plurality of seed devices; and determining a third route entry of a third route entry table for one of the at least one seed device.

7. The system recited in claim 1, wherein the anycast address has a network prefix length that is 128 bits.

8. The system recited in claim 1, wherein the probe is an Internet Control Message Protocol (ICMP) probe.

* * * * *